(12) United States Patent
Rajan et al.

(10) Patent No.: US 8,208,960 B2
(45) Date of Patent: Jun. 26, 2012

(54) WIRELESS DEVICE ACCESS TO INTERNET VIA PERSONAL COMPUTER

(75) Inventors: Muralidhar Rajan, Bangalore (IN); Santosh Prabhu, Bangalore (IN); Sachin D. Naik, Bangalore (IN)

(73) Assignee: KYOCERA Corporation, Kyoto (JP)

( * ) Notice: Subject to any disclaimer, the term of this patent is extended or adjusted under 35 U.S.C. 154(b) by 702 days.

(21) Appl. No.: 11/871,019

(22) Filed: Oct. 11, 2007

(65) Prior Publication Data

US 2010/0273526 A1    Oct. 28, 2010

(51) Int. Cl.
*H04B 1/38* (2006.01)
(52) U.S. Cl. .................. 455/557; 455/419; 455/420
(58) Field of Classification Search .................. 455/557, 455/419–440
See application file for complete search history.

(56) References Cited

U.S. PATENT DOCUMENTS 6,633,759 B1 * 10/2003 Kobayashi .................... 455/419
2007/0082702 A1   4/2007 Maanitty

OTHER PUBLICATIONS

N. Golime, Abstract—"Bluetooth Dynamic Scheduling and Intereference Mitigation" Mobile Networks and Application, Oct. 26, 2004, vol. 9, No. 1, Feb. 2004, Springer Netherlands (retrieved online Oct. 10, 2007) http:/www.springerlink.com/content/n396230w4683882.
Porras, J., et al., Abstract—"Peer-to-peer communication approach for a mobile environment", 7pp. , Jan. 5-8, 2004, System Science, 2004 Proceedings of the 37th Annual Hawaii International Conference, Lappeenranta Univ. of Technol., Finland (retrieved online Oct. 10, 2007) http://ieeexplore.ieee.org/search/srchabstract.jsp?arnumber=1265717&isnumber=28293&punumber=8934.

* cited by examiner

*Primary Examiner* — Kamran Afshar
*Assistant Examiner* — Sayed T Zewari

(57) ABSTRACT

A wireless device, system and method that receive a downloadable file from a wide area network are described. The system comprises a wireless device, a computer and a computer software module. The computer is communicatively coupled to a modem that communicates with a wide area network. The computer further comprises a computer wireless communications module that communicates with at least one wireless device that is in proximity to the computer. The wireless device comprises a device memory, a first wireless device communications module that is configured to communicate with the computer wireless module, and a device display that displays a link that corresponds to a downloadable file accessible using the wide area network. The computer software module resides on the computer and receives the link from the wireless device. The computer software module requests the downloadable file from the wide area network and forwards the downloadable file to the wireless device without storing the downloadable file on the computer.

19 Claims, 3 Drawing Sheets

WIRELESS DEVICE ACCESS TO INTERNET VIA PERSONAL COMPUTER

FIELD OF THE INVENTION

This invention relates to a wireless device, system and method for downloading a file to a wireless device using a computer that is operatively coupled to a wide area network. More particularly, the invention relates to downloading a file to a wireless device with a networked computer without storing the downloadable file on the computer.

BACKGROUND

Wireless devices such as mobile handsets provide a variety of services including voice calls, instant messaging, access to the Internet and storage of files such as music files, picture files, and even movie files. Generally, these wireless devices operate in a number of different communication bands. For example, In the United States, the cellular bands may operate at approximately 850 megahertz (MHz), and for the PCS (Personal Communication System) band at around 1900 MHz. Other communication bands include the PCN (Personal Communication Network) at approximately 1800 MHz, the GSM (Groupe Speciale Mobile) at approximately 900 MHz and 1830 MHz, and the JDC (Japanese Digital Cellular) at approximately 800 MHz and 1500 MHz.

These mobile handsets are used for a variety of different applications including downloading files from the Internet or other such wide area networks. The downloaded files include text, images, pictures, ringtones, music, movie clips, movies, and any other such data files. Generally, a user is presented with a hyperlink or "link" that is displayed on the mobile handset. This link may be included in messages or be part of a web page. In specific situations, the hyperlink enables users to download files from the Internet. Currently, when the user clicks on the link, the download happens through a mobile carrier that establishes a data connection. As a result of using the mobile carrier for downloading the data file, the user is typically charged an additional fee.

Generally, when a user establishes a data connection using a mobile carrier, the user incurs additional charges. These additional charges may be incurred when a user connects to the Internet using a mobile device.

There are additional limitations associated with using a carrier such as slow download speeds. Thus, the user may have to wait a long time to receive a download that corresponds to the link. Therefore, it would be beneficial to provide an alternative to using a carrier for downloading data files. Additionally, it would be helpful to support fast downloads using alternative networks.

Furthermore, it would be helpful to minimize the costs incurred by the users for downloading files by clicking on the link received on their mobile devices. Further still it would be helpful to make use of the available wireless communication standards available on a wireless device, and the ability of the wireless device to communicate with other electronic devices.

SUMMARY

A system for downloading at least one file from a wide area network is described. The system comprises a wireless device, a computer, and a computer software module. The computer is communicatively coupled to a modem that communicates with a wide area network. The computer further comprises a computer wireless communications module that communicates with at least one wireless device that is in proximity to the computer. The wireless device comprises a device memory, a first wireless device communications module that is configured to communicate with the computer wireless module, and a device display that displays a link that corresponds to a downloadable file accessible using the wide area network. The computer software module resides on the computer and receives the link from the wireless device. The computer software module requests the downloadable file from the wide area network and forwards the downloadable file to the wireless device without storing the downloadable file on the computer.

A wireless device that is configured to receive a downloadable file from a wide area network is also described. The wireless device comprises a first wireless device communications module, a device display, a wireless device software module, and device memory. The first wireless device communications module communicates with a computer. The computer is communicatively coupled to a modem that communicates with a wide area network. The computer further comprises a computer wireless communications module that communicates with the first wireless device communications module. The device display displays a link, in which the link corresponds to a downloadable file that is accessible using the wide area network. The wireless device software module communicates the link from the wireless device to the computer. The wireless device software module triggers the computer to request the downloadable file from the wide area network without storing the downloadable file on the computer. The device memory stores the downloadable file on the wireless handset.

A method for downloading a file to a wireless device is also described. The method comprises displaying a link on a display corresponding to the wireless device wherein the link corresponds to a downloadable file that is accessible using a wide area network. The method then proceeds to communicate the displayed link from the first wireless device communications module to a computer wireless communications module. The computer receives the link. The computer is in communication with a modem that is communicatively coupled to a wide area network. The computer is enabled to request the downloadable file associated with the link from the wide area network on behalf of the wireless device. The method then proceeds to cause the computer to forward the requested downloadable file to the wireless device without storing the downloadable file on the computer. The downloadable file may be stored on a device memory that corresponds to the wireless device.

DRAWINGS

The present invention will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems, and devices described hereinafter may vary as to configuration and as to details. Additionally, the methods may vary as to details, order of the actions, or other variations without departing from the illustrative method disclosed herein.

The illustrative embodiment described herein uses a wireless communication technology such as Bluetooth to enable a user to click on a link displayed on the wireless device and communicate the link to a networked computer. The networked computer then forwards the request to a wide area network and routes the corresponding multimedia content to the wireless device without storing the multimedia content on the computer. The multimedia content is accessed on the wireless device, and from the user's perspective these operations are transparent.

Therefore, the wireless device does not require an IP stack to be able to download content from a wide area network. Additionally, the wireless device is capable of using the computing resources available on a computer, thereby making the process of downloading the file more efficient. Furthermore, the user may select the optimal network to download multimedia content to the wireless device.

Figure 1:
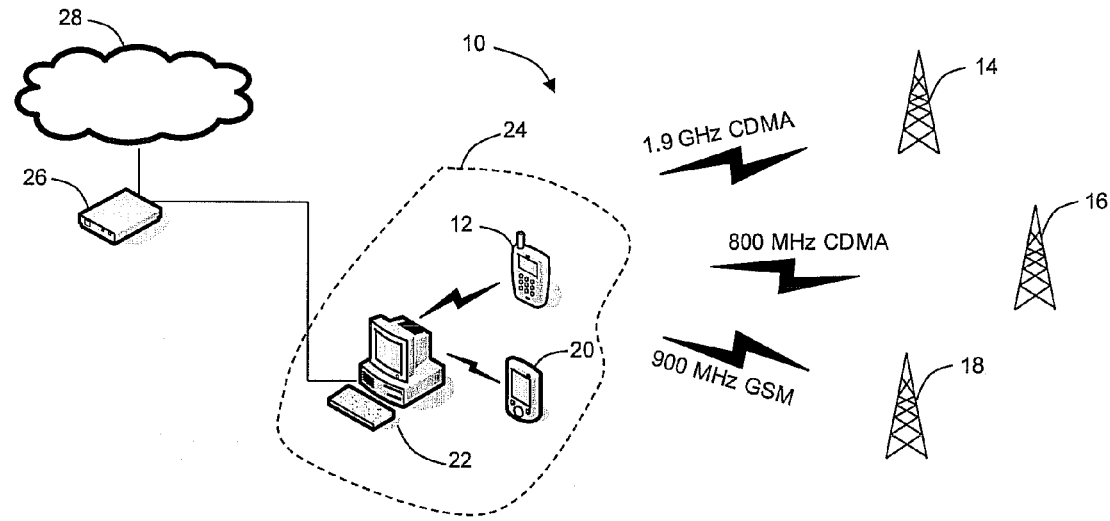
FIG. 1 shows an illustrative system for downloading a file from a wide area network to a wireless device using a computer that forwards the downloadable file without storing the downloadable file on the computer.

Referring to FIG. 1 there is shown an illustrative system for downloading a file from a wide area network to a wireless device using a computer that forwards the downloadable file without storing the downloadable file on the computer. In the illustrative system 10, the first wireless device is a wireless handset 12 that is configured to communicate with one or more base stations 14, 16 and 18 using at least one communication access technologies (CATs). The illustrative base stations may communicate with the wireless handset 12 using a variety of different communication standards including, but not limited to, various forms of code division multiple access (CDMA) and time division multiple access (TDMA) wireless interfaces. By way of example and not of limitation, the wireless handset 12 communicates with base station 14 using a CAT that operates using CDMA technology at 1.9 GHz. The wireless handset 12 is also configured to communicate with base station 16 using a CAT that operates using CDMA at 800 MHz. Additionally, the illustrative handset 12 is configured to communicate with base station 18 using a CAT that operates using GSM technology at 900 MHz.

The illustrative wireless handset 12 may also be referred to as a mobile handset, mobile phone, mobile station, wireless phone, portable cell phone, cellular phone, portable phone, a personal digital assistant (PDA), or any type of mobile terminal which is regularly carried by a user and has all the elements necessary for operation in a wireless communication system that is associated with a mobile carrier or service provider. The combination of the wireless handset 12 and a mobile carrier (not shown) is configured to communicate with a wide area network such as the Internet, and the mobile carrier supports delivering downloadable files to the wireless device.

The wireless communication access technology (CAT) include, by way of example and not of limitation, CDMA, GSM or UMTS or any other wireless communication system such as Wi-Fi or WiMAX. It shall be appreciated by those of ordinary skill in the art that the term wireless handset, mobile handset, wireless phone, and mobile phone are interchangeable.

Another illustrative wireless device 20 is also shown. Although the Illustrative wireless device 20 communicates wirelessly with the computer 22, the illustrative wireless device 20 is not able to communicate with the base stations 14, 16, or 18. Instead, the illustrative wireless device 20 obtains network connectivity by using the IP stack that corresponds to the computer 22. The wireless handset 12 is also configured to communicate with computer 22. The computer 22 also comprises a computer wireless communications module configured to communicate with wireless devices 12 and 20 that are close enough to the computer to support wireless communications. By way of example and not of limitation, the computer 22 and wireless devices 12 and 20 each comprise Bluetooth modules that enable the computer 22 to communicate with each of the wireless devices. In another illustrative embodiment, both wireless devices 12 and 20 communicate with computer 22 using a wireless local area network technology such as Wi-Fi.

Each of the illustrative wireless technologies supports communications within a limited area 24. For example, Bluetooth only provides communications between devices within a room and is limited to a distance of approximately 10 meters. Wi-Fi may provide communications between devices located throughout a building or rooms in a house and is limited by a distance of up to 100 meters. Similar wireless technologies may also be employed such as the technologies described in further detail below.

The illustrative computer 22 is communicatively coupled to a modem 26 that is configured to communicate with a wide area network 28. A wide area network includes, but is not limited to, the Internet, an Intranet, or an Extranet, and any other such wide area networks. The illustrative wide area network presented herein is the Internet and the World Wide Web is simply one of the services available on the Internet. The illustrative modem 26 may support high bandwidth or "broadband" communications using an ADSL modem or DOCSIS cable modem or even wireless broadband modem such as a WiMAX modem. Alternatively, low bandwidth communications may also be supported by an illustrative 56 kbps modem. As described in further detail below, the computer also comprises a processor, memory and a local wireless communication module such as a Bluetooth module.

In operation, either of the illustrative wireless devices 12 or 20 is configured to display a "link" that corresponds to a downloadable file that is accessed using the wide area network 28. A hyperlink or "link" is a reference or navigation element that is displayed on an electronic device that brings the referred information to the user when the navigation element is selected by the user. Combined with a data network and a suitable access protocol, a computer can be instructed to fetch the resource referenced. There are a number of ways to format and present hyperlinks. There are various formats or ways in which links are accessed. Generally, links are accessed by selecting hypertext or a graphical user interface element, i.e. widget, such as a button. Hyperlinks can be used in various technologies such as HTML, XML, e-mails, text editors, PDF documents, word processing documents, spreadsheets, and other such places. For illustrative purposes only, the example described herein has a common destination anchor that is a URL used in the World Wide Web that is associated with a downloadable file.

A computer software module is loaded on the computer 22. The computer software module that resides on the computer 22 is configured to receive the link from the wireless device. After receiving the link from the wireless device, the computer 22 requests the downloadable file from the wide area network. The illustrative wide area network is the Internet and the computer 22 is configured to communicate with the Internet using the TCP/IP protocol suite or "IP stack." The computer 22 then proceeds to forward the downloadable file to the wireless device without storing the downloadable file on the computer. The downloadable file can then be stored in a wireless device memory that corresponds to the either wireless device 12 or 20.

Since the wireless handset 12 is able to receive downloads from either the computer or the carrier, the wireless handset also comprises a selectable option that determines whether the wireless device receives the downloadable file from either the computer or the carrier. The selectable option may be a user selectable option that operates manually so that the user is prompted to download the file using either the computer 22 or the carrier that employs base stations 14, 16 or 18 for data communications. Additionally, the wireless device 12 may be configured to automatically trigger the computer 22 to request the downloadable files when the wireless device 12 is within proximity of the computer 22 as determined by the communication area 24.

Figure 2:
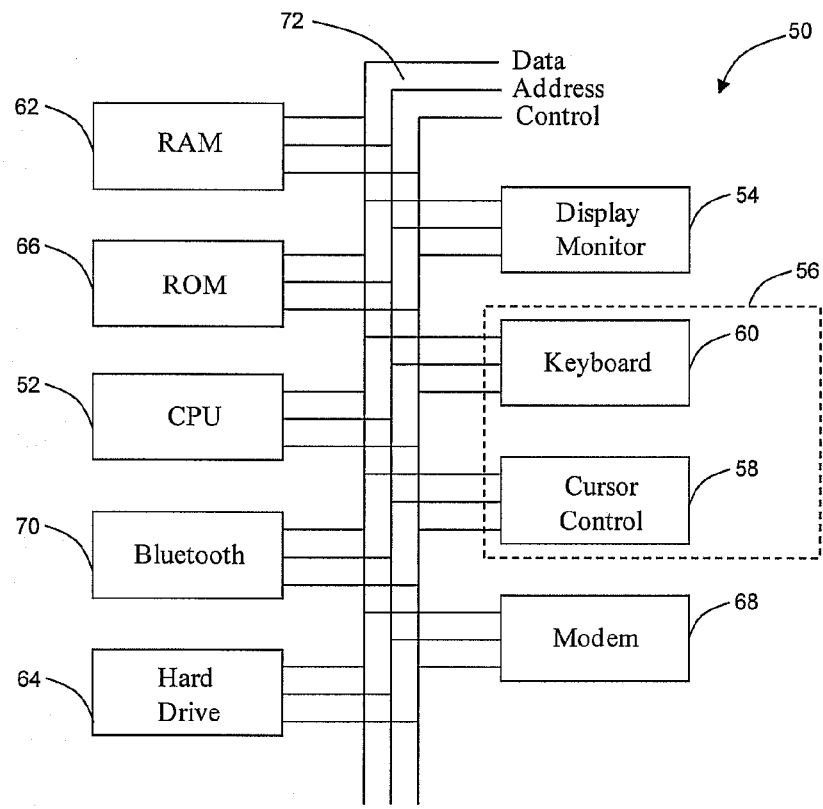
FIG. 2 shows an illustrative computer configured to support wireless communications.

Referring to FIG. 2 there is shown an illustrative personal computer. The illustrative general purpose computer 50 is suitable for implementing the systems and methods described herein. The general purpose computer 50 may be embodied as a personal computer, desktop computer, a laptop computer, a portable computer, an Internet appliance, or any other such device that operates and functions in a manner similar to the general purpose computer 50.

The general purpose computer 50 includes at least one central processing unit (CPU) 52, a display such as monitor 54, and an input device 56 such as cursor control device 58 or keyboard 60. The cursor control device 58 may be implemented as a mouse, a joy stick, a series of buttons, or any other input device which allows user to control the position of a cursor or pointer on the display monitor 54. Another illustrative input device is the keyboard 60. The general purpose computer 50 may also include random access memory (RAM) 62, hard drive storage 64, read-only memory (ROM) 66, a modem 68 and a computer wireless communication module 70 such as a Bluetooth module, wherein the computer wireless communication module is configured to communicate with wireless devices in proximity to the computer. All of the elements of the general purpose computer 50 may be tied together by a common bus 72 for transporting data between the various elements.

The bus 72 typically includes data, address, and control signals. Although the general purpose computer 50 illustrated in FIG. 2 includes a single data bus 72 that ties together all of the elements of the general purpose computer 50, there is no requirement that there be a single communication bus which connects the various elements of the general purpose computer 50. For example, the CPU 52, RAM 62, ROM 66, and computer wireless communication module 70 might be tied together with a data bus while the hard disk 64, modem 68, keyboard 60, display monitor 54, and cursor control device are connected together with a second data bus (not shown). In this case, the first data bus 72 and the second data bus could be linked by a bi-directional bus interface (not shown).

To enable the illustrative wireless devices 12 and 20 to interface with the general purpose computer 50 the user installs the required software module on the computer 50 by downloading the software module or by loading the software module using a computer readable medium such as a CD or other such storage media. In one illustrative embodiment, the software may come prepackaged in a CD that is included with the wireless device 12 or 20. The user then opens the CD and installs the software on the illustrative computer 50. The software module is relatively small and does not consume substantial computing resources.

After the software module has been downloaded, the computer is configured to function in a manner that is similar to a "router" that enables and disables specific computer functions as described herein. More particularly, the computer 50 is configured to forward computer instructions and route data packets to and from either wireless device 12 or 20 without storing the downloadable file on the computer 50 as described herein. Note, a router is a computer that has software and hardware that is tailored to the tasks of routing and forwarding data packets, and the reference to a "router" is provided for instructive purposes only, and is not intended to be limiting.

In operation, the software module that is loaded on the computer 50 configures the computer 50 to receive a request that corresponds to a link that is selected by either wireless device 12 or 20. Once the computer 50 receives the requested link, the computer 50 forwards the requested the link on behalf of the wireless device. The request is forwarded to the wide area network 28 using the illustrative modem 26. In one embodiment, the wireless device 12 or 20 communicates the request wirelessly using Bluetooth technology to the computer 50; the computer 50 then forwards the request to the appropriate URL using an illustrative broadband enabled modem. An illustrative server (not shown) then receives the request for the downloadable file and communicates the requested download to the wireless device 12 or 20 via the computer 50. The downloaded file is stored on either wireless device 12 or 20 and is not stored on the computer 50.

Figure 3:
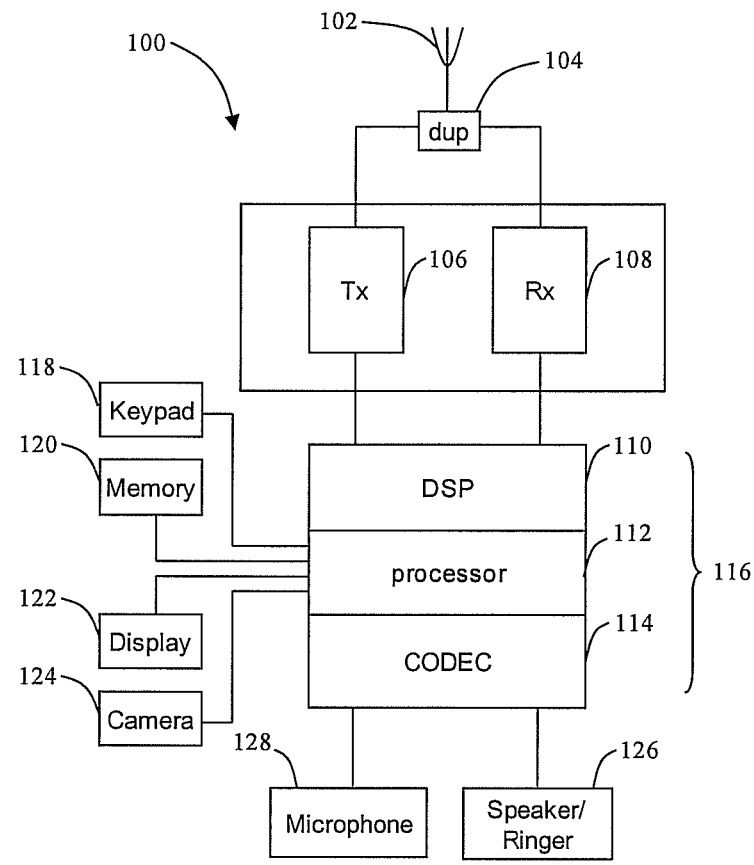
FIG. 3 shows an illustrative wireless device such as a wireless handset configured to communicate with a carrier and the computer.

Referring to FIG. 3 there is shown a block diagram of an illustrative wireless device 100 such as a wireless device 12 configured to communicate with a carrier and the computer 20 or 50. The illustrative wireless device is a multimode wireless handset 100 that is configured to communicate using a plurality of different wireless communication standards including personal area networks, local area networks, and wide area network wireless communication standards. The illustrative multimode wireless handset 100 comprises a first antenna element 102 that is operatively coupled to a duplexer or diplexer 104, which is operatively coupled to a multimode transmitter module 106 and a multimode receiver module 108. The illustrative multimode transmitter module 106 and multimode receiver module 108 each comprise a plurality of transmitter modules and receiver modules that communicate using separate communication technologies such as Bluetooth and CDMA.

An illustrative control module 116 comprises a digital signal processor (DSP) 110, a processor 112, and a CODEC 114 that are communicatively coupled to the transmitter module 106 and receiver module 108. The DSP 110 may be configured to perform a variety of operations such as controlling the antenna 102, the multimode transmitter module 106 and the multimode receiver module 108. The processor 112 is operatively coupled to a keypad 118, a memory 120, a display 122, and a camera 124. Additionally, the processor 112 is also operatively coupled to the CODEC module 114 that performs the encoding and decoding operations and is communicatively coupled to a speaker or ringer 126 and a microphone 128.

The illustrative wireless handset 100 may be built as a light weight and small device adapted to be portable and may be conveniently carried around by a user. The wireless handset 100 is further adapted for caller operation and is enabled to permit a user to manually input data with the keypad 118 that may be a normal key pad, such as key pad for a cell phone or a PDA, and may additionally include specific input keys, such as a scrolling means or the like, to input particular information or to perform particular selection functions. Input data or requests may be taken from voice information that are received from microphone 128 or a combination of voice information and DTMF signals. The memory module 120 may be used for storing input data or storing programming information that is pre-loaded on the wireless handset 100, or that has been downloaded to the wireless handset 100. The memory module 120 may be capable of storing relatively large files including audio files and video files.

The wireless device 100 is configured to communicate wirelessly with the carrier. The wireless device 100 communicates with the carrier using one of the plurality of standards described above. A carrier is a telephone company that provides service for mobile phone subscribers and may also be referred to as a mobile network operator, wireless service provider, wireless carrier, mobile phone operation or cellular company.

The wireless device 100 is also configured to communicate wirelessly with a computer such as computer 22 or general purpose computer 50. For example, the wireless device 100 may communicate with the computer using Bluetooth technology. Bluetooth is a short-range RF communications system providing about 1 Mbps of throughput. Its short range limits usage to devices located within a single room or vehicle. The Bluetooth Core System includes a RF transceiver, a 2.4-2.483 baseband, and a protocol stack. It provides a development platform that can accommodate virtually any type of point-to-point module.

The Bluetooth Protocol Stack comprises several parallel protocol stacks and a variety of module programming interfaces (APIs). Different modules use different stacks, though all modules use the low-level Bluetooth Core Protocols, the Logical Link Control and Adaptation Protocol (L2CAP), Service Discovery Protocol (SDP), Link Management Protocol (LMP), baseband and Bluetooth radio. Bluetooth supports all IP-based modules and also defines a number of Bluetooth service "profiles." Essentially, profiles identify discrete functions typically provided by various computer peripherals, audio/video system components, and other such electronic devices.

A Bluetooth device includes the Bluetooth Core system and there are a number of devices that are classified as falling within device classes: computer, phone, LAN, audio/video, imaging, and peripheral.

Bluetooth "profiles" refers to the standard usage modules of Bluetooth as defined by the Bluetooth SIG. The Bluetooth SIG has a number of work groups that focus on different module areas such as Audio/Video, Printing, and Still Image. Many profiles have been completed and implementations exist and others are still under development and many more are possible. All the profiles comply with the Generic Access Profile that defines requirements common to all Bluetooth profiles and focuses on basic modes and operations like discovery, link establishment and security to ensure connectivity and interoperability between Bluetooth devices.

There are a number of other "generic" Bluetooth profiles that define common requirements for subsets of relevant profiles including, but not limited to, the Generic Object Exchange Profile. The Generic Object Exchange Profile defines common requirements among services that involve sending or receiving structured or non-structured files and records or "objects." The GOEP provides a basis for other data profiles and is based on OBEX.

One of the Generic Object Exchange Profiles is the Object Push Profile (OPP). The Object Push Profile is a basic profile for sending an "object" such as pictures, wall paper, ringtone, mp3, movie clips, or virtual business cards. It is called push because the transfers are always instigated by the sender (client), not the receiver (server). OPP uses the APIs of OBEX profile and the OBEX operations that are used in OPP are connect, disconnect, put, get and abort. By using these APIs the OPP layer resides over OBEX and follows the specifications of the Bluetooth stack. In the illustrative embodiment, when the wireless device 100 communicates the "link" to the computer, the wireless device 100 is the sender or client and the computer 22 or 50 is the receiver or server. And when the computer receives the downloaded content associated with the link, the computer is the client and the wireless device 100 is the receiver or server. It shall be appreciated by those of ordinary skill in the art having the benefit of this disclosure that technologies similar to OPP may be used to communicate the data packets that correspond to the downloadable file. Alternative profiles may also be used. For example, if only an image object is being communicated the Basic Imaging Profile may be used. The illustrative embodiment uses the OPP because the OPP profile is a generic profile that can be used for any kind of object, e.g. picture, ringtone, movie clip, etc.

Although the illustrative embodiment described herein is a Bluetooth embodiment, an alternative embodiment could use Wi-Fi or other such wireless technologies. Wireless Fidelity (Wi-Fi) refers to the 802.11 standard for wireless networking that is commonly used to support IP based module. Wi-Fi is designed as a local area network (LAN) technology, and Bluetooth is a Personal Area Network (PAN) technology.

Wi-Fi and Bluetooth may also be used in combination. Wi-Fi and Bluetooth share many similarities such as operating in the 2.4 GHz range, utilize Frequency Hopping Spread-Spectrum technologies, provide discovery services for peers, and provide authentication and encryption security services. Wi-Fi can operate independently of Bluetooth and thus may compete with one another. However, Wi-Fi and Bluetooth may also complement one another. Thus, since Bluetooth and Wi-Fi share the same 2.4 GHz frequency range, they can potentially interfere with one another. Generally, Bluetooth has an insignificant affect on Wi-Fi due to its low power and Wi-Fi has no noticeable affect when Bluetooth devices are within two-meters of each other.

There are a variety of alternative wireless technologies besides Bluetooth wireless technology that may be implemented in the communications between the wireless device and the computer. These alternative technologies may compete with one another or complement one another. The alternative technologies include, but are not limited to, ultra-wideband wireless technology, certified wireless USB, Worldwide Interoperability for Microwave Access (WiMAX), Wireless Broadband (WiBro), Infrared (IrDA), Near Field Communication (NFC), Near-Field Magnetic Communication, HiperLAN, HIPERMAN, 802.20, ZigBee, and other such wireless technologies that would readily suggest themselves to those of ordinary skill in the art.

Figure 4:
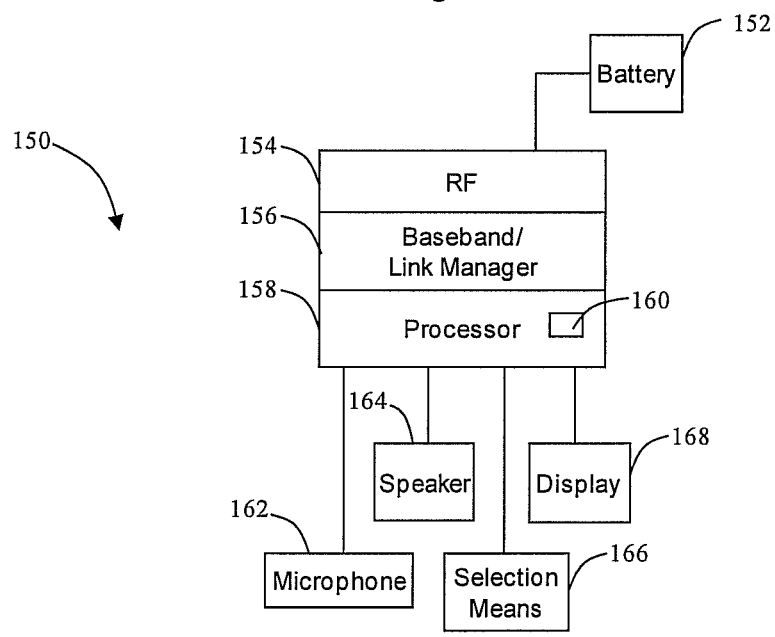
FIG. 4 shows an illustrative wireless device that is configured to communicate wirelessly with the computer.

Referring to FIG. 4 there is shown a wireless handset 150 is configured to communicate wirelessly with the computer 22 or general purpose computer 50. By way of example and not of limitation, the wireless device comprises a wireless communications module such as a Bluetooth communications module that is housed within the wireless device 150. However, the illustrative wireless device 150 is not configured to communicate with a carrier. An illustrative example of the wireless device 150 is described above as wireless device 20 in FIG. 1.

By way of example and not of limitation, the wireless device 150 may be a touch screen display, or other such device that is Bluetooth enabled. The wireless device 150 described herein provides a more detailed expression of Bluetooth system components and may be integrated in the wireless device 100, 12, or 20 that have been previously described.

The illustrative wireless handset 150 comprises a battery 152 and a radio 154 that converts the digital baseband data to and from a 2.4 GHz analog signal using Gaussian Frequency Shift Keying (GFSK) modulation. The Bluetooth wireless device 150 comprises a baseband link controller 156 that manages the core Bluetooth processes that constructs and decodes packets, encodes and manages error correction, encrypts and decrypts, controls, and other such operations. The baseband link controller 156 also creates the links, monitors the health of the links, and terminates the links gracefully.

A processor 158 also runs higher levels of the Bluetooth protocol stack and performs functions that relate to the logical link control and adaptation protocol that determines the connections for the device, the level of performance, and encryption. The logical link control and adaptation protocol is implemented in software. The processor 158 may include a memory module 160 that is used to store the downloaded content.

The computer instructions for applications controlled by the device 150 are processed by the processor 158. The wireless device 150 includes a microphone 162 and speaker 164. A selection means 166 such as a touch screen display 168 is configured to control one or more local applications running on the wireless device 150.

Figure 5:
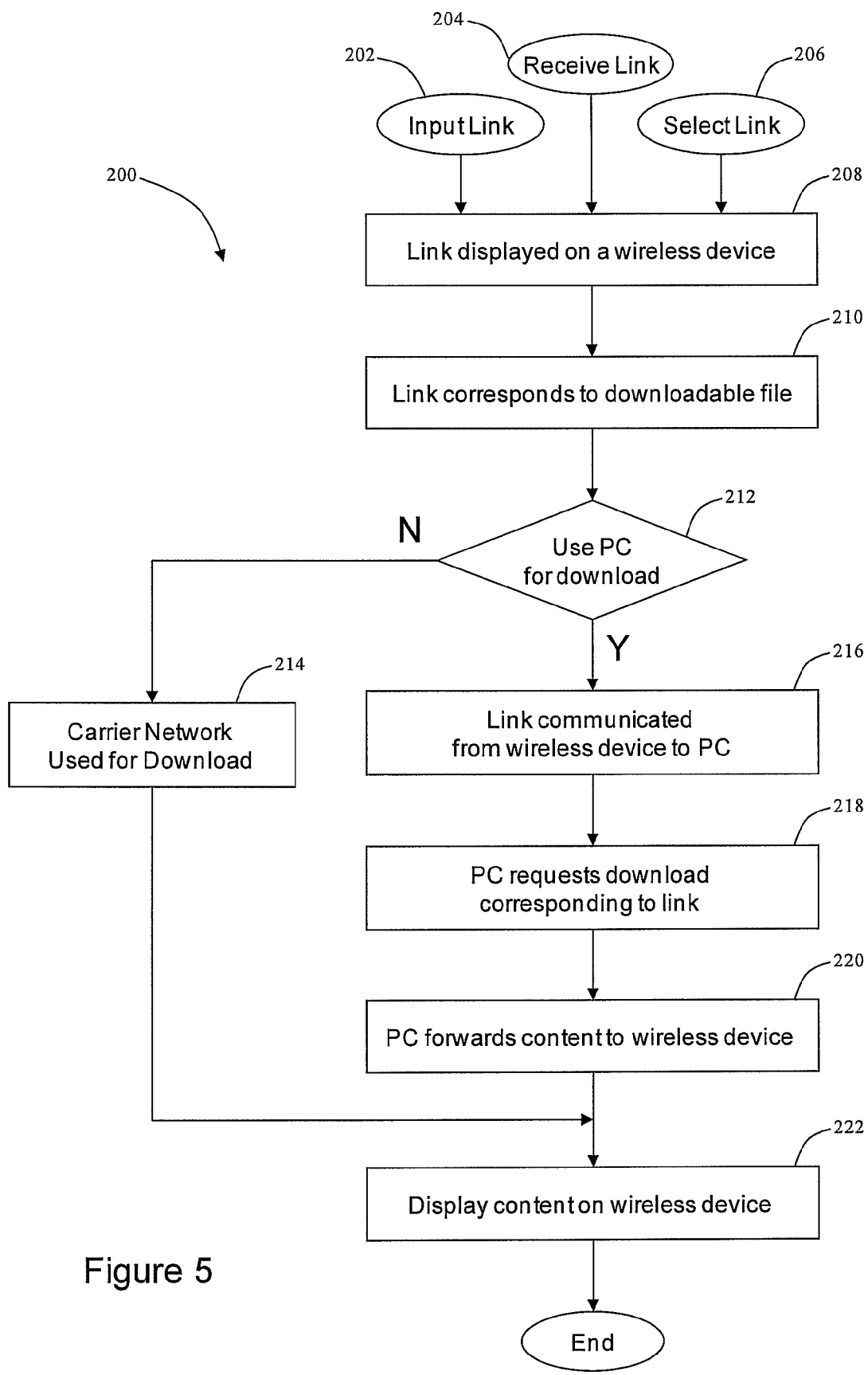
FIG. 5 shows an illustrative flowchart of a method for downloading a file to the wireless device that is communicatively coupled to the computer.

Referring to FIG. 5 there is shown an illustrative method 200 for downloading a file to the wireless device that is communicatively coupled to the computer. Initially, a computer software module is loaded on an illustrative computer such as computer 22 described in FIG. 1 and in FIG. 2. The illustrative computer is then configured to enable and disable specific computer functions as described herein. More particularly, the computer is configured to forward computer instructions and route data packets to and from either wireless device 12 or 20 without storing the downloadable file on the computer 22.

The illustrative method can be initiated by inputting a link 202, receiving a link 204, or selecting a link 206. As previously mentioned, a link corresponds to a downloadable file that is accessible using the wide area network. For illustrative purposes only, the example described herein has a common destination anchor that is a URL used in the World Wide Web that is associated with a downloadable file such as an audio/visual file, multimedia content file, movie file, a music or audio file, a movie clip, movies, ringtones, pictures, text, images and other such data files that are capable of being downloaded from a wide area network such as the Internet, Intranet or Extranet.

By way of example and not of limitation, the inputting of a link 202 may be performed by a user keying the link into the wireless device. An example of receiving a link 204 includes, but is not limited to, having a wireless device receive a text message with a link embedded in the message or in a web page. With respect to a user selecting a link 206, a plurality of link options are presented to the user on the display of the wireless device, where the plurality of links may be received via a WAP Push or other such automated sending of a plurality of link options.

The method then proceeds to block 208, where the link is displayed on the wireless device such as wireless device 12, 20, 100, or 150 described above. The links corresponds to a downloadable file as indicated by block 210. By way of example and not of limitation, the link corresponds to a downloadable file such as a multimedia content file that is accessible using a wide area network such as the Internet.

The method then proceeds to decision diamond 212 where a determination is made whether to use a computer such as a networked personal computer (PC) such as computer 22 or general purpose computer 50 described above. The illustrative PC is configured to provide a connection to the wide area network as described above. In one illustrative embodiment, the decision 212 requires an intervention event to be made at wireless handset 12 or 100 that requires selecting between downloading the file corresponding to the link using either the carrier or the user's computer that has an illustrative high bandwidth Internet connection.

The decision may be a manual decision, i.e. made by the user. The decision may also be automated and triggered by a proximity event, in which the proximity of the wireless handset to a computer having a broadband connection triggers the link request to be communicated to the illustrative PC. Thus, if the decision made by the user at decision diamond 212 is to use the carrier, the method proceeds to block 214 where the carrier manages and controls the downloading of the selected file.

If the user elects to use the PC to download the file to the wireless handset 12 or 20, the method then proceeds to block 216. At block 216, the user "clicks" on the link and communicates the link from the wireless device to the computer using a local wireless communications technology such as Bluetooth. The wireless device 12 or 20 sends the link to the computer 22 or 50 using a Bluetooth profile such as OPP, which is described above.

At block 218, the computer software module residing on the computer initiates the download of the content pointed to by the URL. In operation, the software module that is loaded on the computer configures the computer to receive a request from the wireless device that corresponds to a selected link. Once the computer receives the selected link, the computer forwards the request on behalf of the wireless device. The request is forwarded to the wide area network using the illustrative modem described above. An illustrative server then receives the request for the downloaded file and communicates the requested download to the computer. By way of example and not limitation, the wide area network is the Internet and the computer is configured to communicate with the Internet using the TCP/IP protocol suite.

At block 220, the downloaded content is forwarded by the computer to the wireless device 12 or 20 without storing the downloadable file on the computer. In the illustrative embodiment, the downloaded content is forwarded by the computer to the wireless device using one of the existing Bluetooth profiles such as OPP as described above.

The method then proceeds to block 222 where the wireless device 12 or 20 displays the content to the user. If the wireless device cannot store or display the downloaded content, the data is rejected. The downloaded file may also be a streaming media file that is presented on the wireless device 12 or 20, but is not stored or recorded on the wireless device. Streaming media is multimedia that is continuously received by a user, while it is being delivered by a provider. By way of example only, streaming media technologies include Adobe Flash, Microsoft Windows Media, and QuickTime. Illustrative media content providers include, but are not limited to, YouTube and Netflix.

At block 222, the mobile device may also be configured to store the downloaded file in a memory module disposed on the wireless device 12 or 20. The determination of whether to store the downloaded file or to stream the downloaded file depends on the size of the file, limitations of the wireless device, the computer, the network connection, the content provider, and other such entities that manage or control the distribution of the multimedia content. The entire process is intended to be transparent to the user, as though the processing has been carried out in the wireless device itself.

It is to be understood that the detailed description of illustrative embodiments are provided for illustrative purposes. The scope of the claims is not limited to these specific embodiments or examples. For example, wireless device 12, 20, 100 and 150 are described, however this solution may be extended to any source electronic device having the properties of the wireless devices described herein. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for downloading at least one file from a wide area network, the system comprising:
    a first computer communicatively coupled to a high bandwidth modem that is communicatively coupled to the Internet, the computer further comprising a computer wireless communications module configured to communicate at least one wireless device that is in proximity to the computer;
    at least one base station configured to provide data communications;
    a link that corresponds to a downloadable file accessible using the Internet;
    a wireless device communicatively coupled to the base station and configured to receive the link from at least one base station, the wireless device further comprising;
    a device memory;
    a first wireless device communications module that is configured to communicate with the first computer wireless module;
    a wireless device display that displays the link, wherein the link corresponds to a downloadable file accessible using the Internet;
    a second wireless device communications module that is configured to communicate with the base station associated with a wireless carrier that communicates with the Internet;
    a selection that enables the wireless device to receive the downloadable file from the first computer and not the wireless carrier that communicates with the Internet via the base station; and
    a computer software module that resides on the computer, the computer software module configured to receive the link from the wireless device, request the downloadable file from the wide area network via the high bandwidth modem, and to forward the downloadable file to the wireless device.

2. The system of claim 1 wherein the downloadable file is stored in the wireless device memory.

3. The system of claim 1 wherein the computer wireless communications module and the first wireless device communications module are Bluetooth modules.

4. The system of claim 1 wherein the wireless device automatically triggers the computer request for the downloadable file.

5. A wireless device that is configured to receive a downloadable file from a wide area network, the wireless device comprising:
    a first wireless device communications module that is configured to communicate with a first computer communicatively coupled to a first modem that is configured to communicate with a wide area network, wherein the wide area network is the Internet;
    a second wireless device communications module that is configured to communicate with a wireless carrier that communicates with the wide area network, wherein the wireless device comprises a selection, in which the wireless device receives the downloadable file from the first computer and not the wireless carrier network;
    the first computer further comprising a computer wireless communications module configured to communicate with the first wireless device communications module;
    the computer further comprising a computer software module that resides on the computer, the computer software module configured to receive the link from the wireless device, request the downloadable file from the wide area network, and forward the downloadable file to the wireless device;
    a device display that displays a link, wherein the link corresponds to a downloadable file that is accessible using the wide area network; and
    a wireless device software module configured to communicate the link from the wireless device to the computer, the wireless device software module configured to trigger the computer to request the downloadable file from the wide area network.

6. The wireless device of claim 5 further comprising a device memory configured to store the downloadable file.

7. The wireless device of claim 5 wherein the computer wireless communications module and the first wireless device communications module are Bluetooth modules.

8. The wireless device of claim 5 wherein the selectable option comprises an automated option.

9. A method for downloading a file to a wireless device, the method comprising:
    receiving a link associated with a message or URL at the wireless device from a base station accessing the Internet;
    displaying the link on a display corresponding to the wireless device, the link corresponds to a downloadable file that is accessible using the Internet;
    presenting a selection, in which the wireless device receives the downloadable file from a first computer communicatively coupled to the Internet via a modem and not via the base station accessing the Internet;
    communicating the received link from a first wireless device communications module associated with the wireless device to a computer wireless communications module associated with the first computer;
    receiving the link at the first computer, the first computer in communication with the modem that is communicatively coupled to a wide area network, wherein the wide area network is the Internet;
    enabling the computer to request the downloadable file from the wide area network on behalf of the wireless device via the first computer communicatively coupled to the modem and not the base station accessing the Internet;

causing the first computer to forward the requested downloadable file to the wireless device; and storing the downloadable file on a device memory that corresponds to the wireless device.

10. The method of claim 9 wherein the computer wireless communications module and the first wireless device communications module are Bluetooth modules.

11. The method of claim 9 wherein the determining of whether the wireless device receives the downloadable file from either the computer or the carrier occurs in an automated manner.

12. The system of claim 1 wherein the link is communicated to the wireless device via the base station associated with the carrier network.

13. The system of claim 12 wherein the downloadable file is first received by the first computer via the high bandwidth modem coupled to the first computer.

14. The system of claim 13 wherein the downloadable file received by the first computer via the high bandwidth modem is subsequently forwarded to the wireless device memory without storing the downloadable file on the first computer.

15. The system of claim 5 wherein the link is communicated to the wireless device via the base station associated with the carrier network.

16. The system of claim 15 wherein the downloadable file is first received by the first computer via the high bandwidth modem coupled to the first computer.

17. The system of claim 16 wherein the downloadable file received by the first computer via the high bandwidth modem is subsequently forwarded to the wireless device memory without storing the downloadable file on the first computer.

18. The system of claim 9 wherein the downloadable file is first received by the first computer via a high bandwidth modem coupled to the first computer.

19. The system of claim 18 wherein the downloadable file received by the first computer via the high bandwidth modem is subsequently forwarded to the wireless device memory without storing the downloadable file on the first computer.

\* \* \* \* \*